United States Patent
Matula et al.

(10) Patent No.: US 10,757,251 B1
(45) Date of Patent: Aug. 25, 2020

(54) REAL TIME SIGN LANGUAGE CONVERSION FOR COMMUNICATION IN A CONTACT CENTER

(71) Applicant: Avaya Inc., Santa Clara, CA (US)

(72) Inventors: Valentine C. Matula, Granville, OH (US); Pushkar Yashavant Deole, Pune (IN); Sandesh Chopdekar, Pune (IN); Sadashiv Vamanrao Deshmukh, Pune (IN)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/557,488

(22) Filed: Aug. 30, 2019

(51) Int. Cl.
| | | |
|---|---|---|
| *H04M 3/42* | (2006.01) | |
| *H04M 3/51* | (2006.01) | |
| *H04L 29/06* | (2006.01) | |
| *G10L 13/00* | (2006.01) | |
| *G06K 9/00* | (2006.01) | |
| *G06F 40/58* | (2020.01) | |

(52) U.S. Cl.
CPC ........ *H04M 3/42391* (2013.01); *G06F 40/58* (2020.01); *G06K 9/00355* (2013.01); *G06K 9/00744* (2013.01); *G10L 13/00* (2013.01); *H04L 65/602* (2013.01); *H04M 3/5183* (2013.01)

(58) Field of Classification Search
CPC ........... H04M 3/42; H04M 3/51; H04L 29/06; G06K 9/00; G06F 17/28; G10L 13/00
USPC ................ 379/52, 93.15; 348/14.01–14.12; 704/235
See application file for complete search history.

(56) References Cited

U.S. PATENT DOCUMENTS

| | | | |
|---|---|---|---|
| 6,477,239 B1* | 11/2002 | Ohki ................... | G09B 21/009 348/14.01 |
| 2002/0140718 A1* | 10/2002 | Yan ........................ | G10L 21/06 715/706 |
| 2009/0012788 A1* | 1/2009 | Gilbert ................. | G09B 21/009 704/235 |
| 2011/0157472 A1* | 6/2011 | Keskinen ............. | G09B 21/009 348/564 |
| 2017/0277684 A1* | 9/2017 | Dharmarajan Mary ..................... G06F 17/2836 | |
| 2019/0130176 A1* | 5/2019 | Maxwell ................ | G06F 40/55 |

* cited by examiner

*Primary Examiner* — Melur Ramakrishnaiah
(74) *Attorney, Agent, or Firm* — Sheridan Ross P.C.

(57) ABSTRACT

Interactions between agents of a contact center and customers provide the bulk of many communications and generally work well, except when the customer is deaf or mute. Customers that sign would often prefer to conduct interactions in sign language but the pool of agents having such skills is limited. By providing systems and methods to alter an image of a non-signing agent, a customer may be presented with an image of a signing agent. Additionally, systems and methods herein enable a non-signing agent to be presented with generated speech and/or text translated from the signing gestures provided by the image of the signing customer.

20 Claims, 6 Drawing Sheets

REAL TIME SIGN LANGUAGE CONVERSION FOR COMMUNICATION IN A CONTACT CENTER

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for video image manipulations and particularly to generating video content for integration into a live video feed.

BACKGROUND

Voice is typically the most preferred channel of communications by customers interacting with an agent of a contact center and the majority of interactions do take place over voice channel. However, voice channel is of no use to customers who are deaf and/or mute. Such customers may rely on assistance devices, such as TeleTYpe (TTY), Telecommunications Device for the Deaf (TDD) or Text Telephone (TT). While effective, it is often not preferred as such customers are often more comfortable and efficient communicating in sign language (e.g., American Sign Language).

Most contact center agents are utilized for a particular skill, such as understanding how to troubleshoot issues, having product knowledge, and language. The pool of personnel that are able to communicate in a particular language, including sign language, is generally proportional to the use of the language in a given area or even worldwide. This leaves a very limited pool of resources from which to draw upon. Contact centers strive to accommodate customers' preferred communications, including language. If contact center facilities are to be availed by such customers then the contact center needs to employ agents who understand sign language. This is challenging as people who are not deaf or mute are rarely trained in sign language and rarer still, fluent. Hiring dedicated agents for signing interactions, who may be deaf or mute themselves, may result in poor utilization of such agents as voice communications may be difficult or impossible. As a result, contact centers are reluctant to hire or train signing agents and deaf or mute customers remain deprived of communicating with contact center agents in their preferred language.

SUMMARY

Avaya is committed to providing solutions to enable effective and efficient communications with all customers. Prior art solutions require deaf and/or mute customers to communicate with text devices or forgo the interaction completely, such as to enlist the help of someone who can conduct a voice interaction on their behalf. Embodiments herein are generally directed to enabling real time conversion of sign language into voice and/or text that could be understood by non-signing agents and convert the agent's voice or text into sign language visual representations to be applied to an image of the agent, such as by superimposing the gestures and/or manipulating the image of the agent so as to present the customer with a real time image of the agent communicating through signing.

In one embodiment, an application is disclosed that enables a customer communication device to provide real-time two-way signing communication between a customer and an agent of a contact center, with only one party signing. The application may be deployed on a computer or mobile device (e.g., smart phone) for use by the community of deaf and mute customers for initiating interactions with the contact center. The application may be used by the customers to initiate a video call with the contact center. Once the customer is connected to an agent, the customer can make use of sign language (e.g. American sign language) to interact with the agent via streaming video with the agent.

While embodiments herein are generally described with respect to enabling video communication between a non-signing agent and a signing customer, embodiments are also contemplated wherein the video communication is enabled between a signing agent and non-signing customer.

In another embodiment, a contact center component, such as a server, implements a sign language interpreter upon recognition that the current agent-customer session with a signing customer. Once the customer is connected to the agent, the video of the signing customer is streamed from the customer communication device to the contact center server and processed by a sign language interpreter engine.

The sign language interpreter engine is responsible for converting sign language into text and/or voice transcripts which are fed to the agent. The sign language interpreter engine may be a proprietary engine or a publicly available engine that is capable of converting the sign language with specific standard (e.g. American Sign Language) into text/voice transcripts. The sign language interpreter engine may be customized, such as to give processing priority to detect words more likely to be encountered. For example, a customer initiating an interaction with an airline is more likely to utilize words associated with travel as opposed to words associated with banking, which may be highly likely had the customer initiated the interaction with a bank or other financial institution.

In another embodiment, the sign language interpreter engine converts text and/or voice into sign language. For conversion of text or voice back into sign language, the contact center may make use of multiple video technologies through which signing could be superimposed on the image of the agent. This provides a much more natural feel to the customer who is presented with a real time image of the signing agent. For example, in one embodiment, a green screen or chroma key technology is implemented that allows a portion of an image of an agent, such as one captured that has a particular single color, commonly green, that is replaced with an alternative image, such as the image of arms and hands signing.

In certain embodiments, a visual library of video images of words or phrases signed by the agents may be captured at a first time, such as during a session with a coach, for subsequent playback during an interaction with a customer. These words or phrases are then stored in a database and when a particular agent is serving the call to impaired customer, the captured images can be included with the image of the agent, such as from the neck up, and streamed back to the customer. In such an embodiment, the face of real agent is kept in the video presented to the customer along with a portion of the video comprising signing sequences formed by combining previously captured images for the agent, such as superimposing signing sequences over the agent's body. The foregoing embodiment may be particularly well suited to implementation in small contact centers with a relatively limited number of agents or other implementation where the time investment required to create the video library for each agent is desired.

In another embodiment, at least one processor executing an algorithmic or artificial intelligence agent may provide video manipulation. The original video of a non-signing agent may be modified/manipulated, in real time, to provide the desired signing gestures and/or facial expressions. The processor may implement or receive modifications to the video that are superimposed or supplant the image, as captured, of the agent or portions of the agent (e.g., hands, arms, and/or face) to provide the customer with a real time image of the agent signing and/or expressing the processor-determined visual content. The foregoing embodiment may be particularly well suited to larger contact centers or other embodiments where it is not desirable to create a library of recorded expressions for each agent.

In another embodiment, the at least one processor may alter the image of the agent's face or portion (e.g., lips) so as to provide the video image presented to the customer of the agent that has signing expressions synchronized with their facial expressions. Generally, signing occurs at a slower pace compared to speech and the real (i.e., unmodified) image of the agent speaking may require the processor to produce an image of the agent signing at an unnatural or incomprehensible pace. Accordingly, the signing may be provided at a more natural or comprehensible pace and the speech of the agent delayed by inserting delays or pauses into the image of the agent's face. As a result, the image of the agent's face, including the visual expression of speech or emotion, is synchronized with the signing images.

Customers waiting in queue for an agent may be presented with a visual image, such as a countdown clock, estimation of when their call will be answered, number of callers ahead of the customer etc. In another embodiment, signing customers waiting in queue may be presented with an image of a video receptionist presenting signed information, such as time left in queue, estimated answer time, etc.

In another embodiment, the application may be configurable to allow the customer to receive signed images, closed captioning, or both. When the customer has configured to receive only the closed captioning, then the processor providing video manipulation of the live agent may be omitted while the voice of the live agent is fed into a speech-to-text engine to generate closed captioning for presentation on the customer's communication device.

In another embodiment, recording of the interaction may be provided for record keeping, feedback into human or automated quality management processes, or other purposes. Recordings may be maintained for one or more of the incoming video, raw video of the agent, text transcription of the agent's voice, text transcription the agent's generated signing, text transcription of the customer's signing, generated speech transcription from the customer's signing, raw video of the agent or portions of the agent (e.g., face, head, etc.), manipulated portion(s) of the image of the agent (e.g., hands, arms, mouth, lips, face, etc.) that are then inserted into the final video, and/or the final video as delivered to the customer's communication device.

These and other needs are addressed by the various embodiments and configurations of the present invention. The present invention can provide a number of advantages depending on the particular configuration. These and other advantages will be apparent from the disclosure of the invention(s) contained herein.

In one embodiment, a system for real-time sign language translation is disclosed, comprising: a communication interface configured to receive a video image of a human agent engaged in an interaction via a network with a customer utilizing a customer communication device; a processor having an accessible memory; and the processor configured to: receive the video image of the human agent; receive an audio input comprising speech of the human agent; determine a sign language gesture of the speech; modify the video image of the human agent to comprise the sign language gesture; and present the customer communication device with the modified video image of the human agent comprising the sign language gesture.

In another embodiment, a method is disclosed, comprising: receiving a video image of a human agent engaged in an interaction, via a network, with a customer utilizing a customer communication device; receiving the video image of the human agent; receiving an audio input comprising speech of the human agent; determining a sign language gesture of the speech; modifying the video image of the human agent to comprise the sign language gesture; and presenting the customer communication device with the modified video image of the human agent comprising the sign language gesture.

In another embodiment a system is disclosed, comprising: means to receive a video image of a human agent engaged in an interaction, via a network, with a customer utilizing a customer communication device; means to receive the video image of the human agent; means to receive an audio input comprising speech of the human agent; means to determine a sign language gesture of the speech; means to modify the video image of the human agent to comprise the sign language gesture; and means to present the customer communication device with the modified video image of the human agent comprising the sign language gesture.

The term "signing" when referring to a human or a human proxy, is able to communicate by providing sign language gestures (e.g., American Sign Language, finger spelling, etc.). The human proxy may be an avatar, the playback of a recorded image of a human signing, or other graphical element that may present sign language gestures in a manner similar to that of a signing human. The term "non-signing" refers to a human, or human proxy, that is currently communicating in a manner other than by use of signing.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term"means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
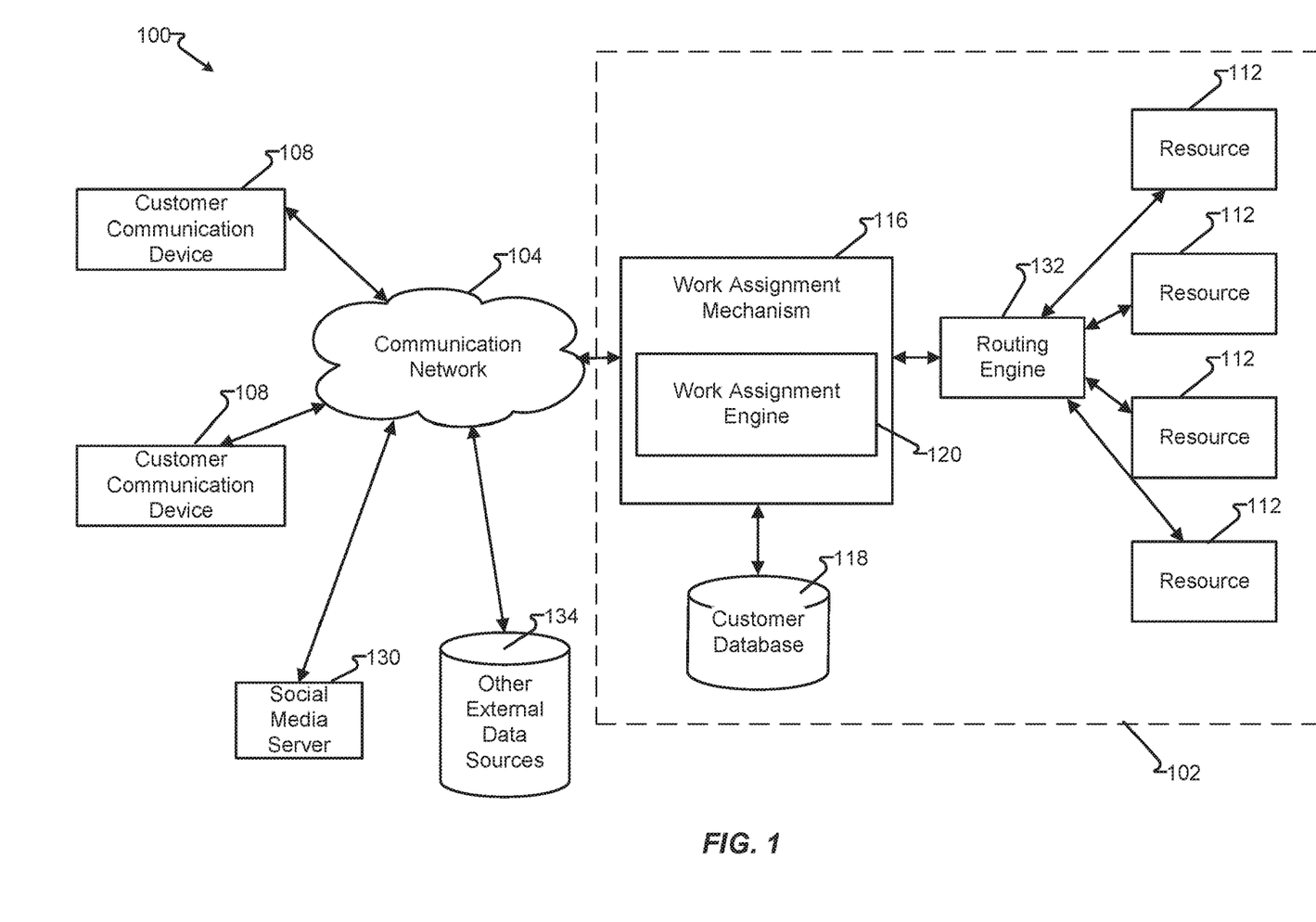
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media website 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, telephone, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

While resources 112 are variously embodied, as described above, the embodiments herein are directed towards a human agent utilizing an agent communication device. The agent communication device comprising at least a camera, to capture a live video image of the agent; a screen, to present the agent with a live video image of the customer, utilizing a customer communication device comprising at least a camera; a processor (i.e., at least one microprocessor); a data storage and/or memory accessible to the processor; and a network interface. In certain embodiments the agent communication device may omit such components internally but when omitted internally have access to such omitted components via a data connection, such as a network or connected peripheral device. Embodiments herein are generally directed towards an agent communication device, utilized by a non-signing human agent, and a customer communication device, utilized by a signing customer and, therefore, the agent communication device further comprises or utilizes a microphone for capturing speech from the human agent and components and/or instructions for converting speech in to sign language. In another embodiment, the human agent signs and the customer is non-signing and, therefore, the customer communication device comprises a microphone for capturing speech from the customer that other systems and mythologies then convert to sign language.

Figure 2:
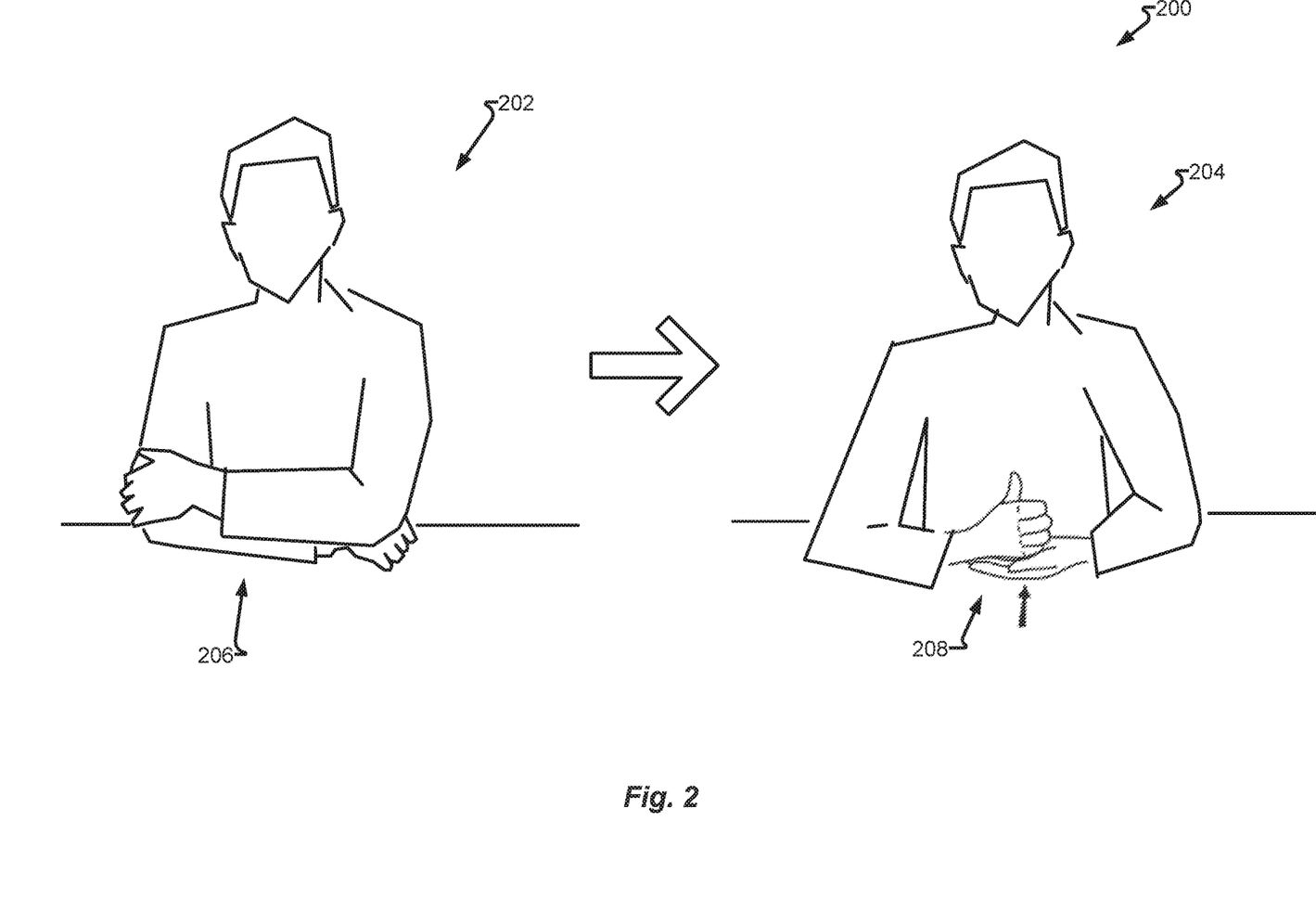
FIG. 2 depicts an image transformation in accordance with embodiments of the present disclosure.

FIG. 2 depicts image transformation 200 in accordance with embodiments of the present disclosure. Image transformation 200 may be performed by at least one processor executing instructions as described herein. In one embodiment, raw image 202 is captured by a camera of a human agent, such as one engaged in an interaction with a customer over a network (not shown). Raw image 202 is captured and processed by a processor to become processed image 204. More specifically, human agent is not signing, and is generally communicating via providing speech to a microphone connected to a processor. Gesture 206 is neutral or otherwise provides no useful signed information. Upon processing gesture 208 is inserted into the image and resulting processed image 204 provided to the customer's communication device.

As will be described more thoroughly with respect to the embodiments that follow, gesture 206 may be replaced with gesture 208. In one of the more simple implementations, the portion of raw image 202 comprising the hands and, at least, forearms of the human agent is replaced with box similar to a picture-in-picture feature, wherein the inserted box presents images of hands making sign language gestures. However such a technique may be ineffective in to present a realistic image of the human agent signing. In other implementation a digital overlay is mapped to the image of the hands of the human agent (see FIG. 3), additionally or alternatively, chroma key composting, augmented reality, or other video processing technique may be provided to enable raw image 202 to provide the appearance of a signing human agent when the human agent is not signing.

Figure 3:
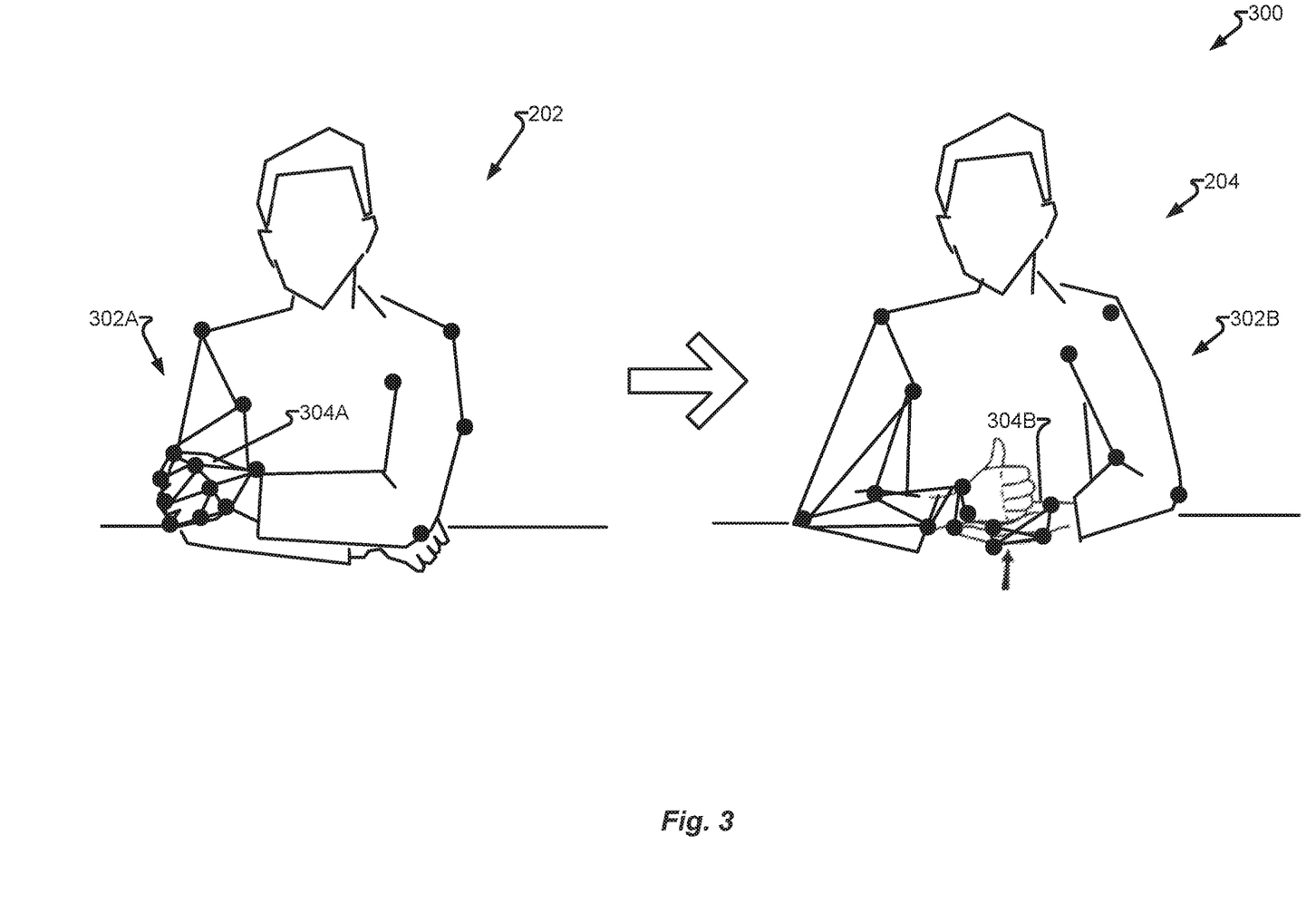
FIG. 3 depicts an image transformation mapping in accordance with embodiments of the present disclosure.

FIG. 3 depicts image transformation mapping 300 in accordance with embodiments of the present disclosure. In one embodiment, raw image 202 is parsed, by at least one processor, into a number of polygons, such as polygon 304A. The at least one processor then alters (e.g., stretch, scale, brighten/darken to add/remove shadows, hide/reveal, rotate, transpose, etc.) polygon 304A to become polygon 304B in processed image 204 and thereby present a sign language gesture.

Polygons, such as polygon 304, may be formed from the vertices of markers 302A captured in raw image 202. The polygons may mark a known point of interest (e.g., digits of a hand) and/or a transition of one video attribute (e.g., color, hue, brightness, contrast, etc.) to another, which may be above a previously determined threshold. While raw image 202 and processed image 204 illustrate a limited number of markers 302A and 302B respectively in order to avoid overly complicating the figure, it should be appreciated that any number of markers may be utilized in order to provide the desired resolution of the gesture. For example, the hands are the primary source of visual information in sign language and may be provided with sufficient markers to identify the position of each finger joint, wrist, overall hand rotation, etc. Additionally or alternatively, fewer markers may be provided to areas conveying less information, such as the shoulder or elbow. It should be appreciated that while the embodiments herein are generally directed towards providing images of the hands signing, from a non-signing human agent, to a customer, that other body parts and positions may be utilized without departing from the scope of the embodiments herein. For example, raising eyebrows and head tilts may be applied to form a portion of processed image 204, such as one means to convey the asking of a question versus a statement.

Figure 4:
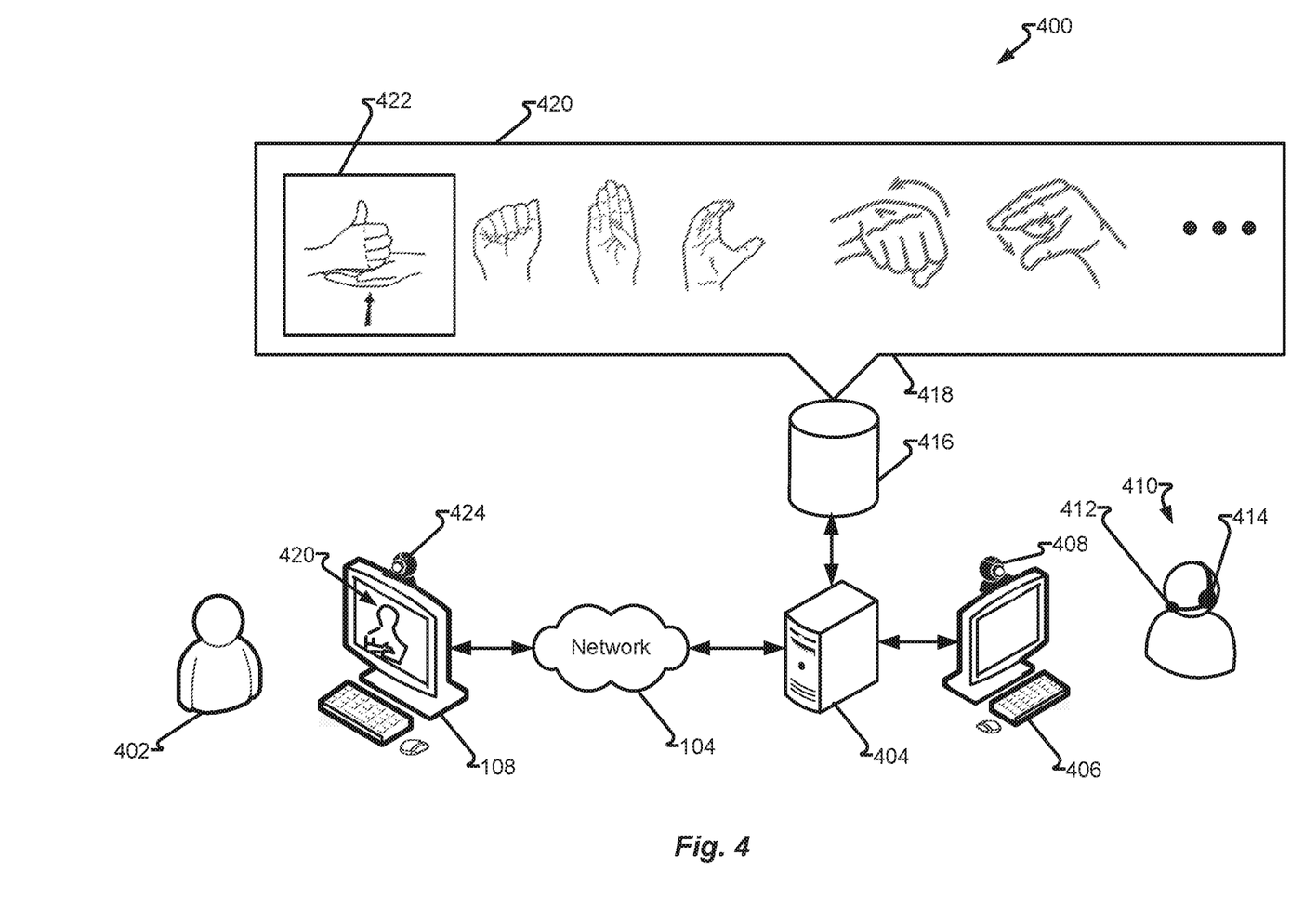
FIG. 4 depicts a second system in accordance with embodiments of the present disclosure.

FIG. 4 depicts system 400 in accordance with embodiments of the present disclosure. In one embodiment, human agent 410 is engaged in an interaction with customer 402 via network 104. Agent communication device 406, may be computer having a communication interface, such as to enable communications with server 404, network 104, and/or other components. Agent communication device 406 may comprise camera 408 to capture images of human agent 410, microphone 412 to capture speech provided by human agent 410, speakers 414 to present audio, such as speech generated by server 404 and/or agent communication device 406, to human agent 410. It should be appreciated that the form factor illustrated (e.g., headset) is merely illustrative and other form factors, in particular an embodiment of microphone 412 that does not visually obscure the mouth of human agent 410 to camera 408, may be utilized.

Camera 408 receives live image of human agent 410 and microphone 412 receives speech from human agent 410. Signals from camera 408 and/or microphone 412 may be processed by at least one processor, such as those associated with server 404. Server 404 may determine that human agent 410 said a word or phrase and accesses a record maintained in database 416, such as record 418 comprising representations 420 of sign language gestures. It should be appreciated that while representations 420 are illustrated as graphics, the actual content maintained in database 416 are computer instructions and/or graphical elements that may be utilized to create a processed image (e.g., processed image 204). Representations 420 may comprise vector maps, to enable a processor to move one marker (see markers 302 of FIG. 3) from on position within a frame to another and redraw the polygon(s) having the moved marker as a vertex; video images, such as previously recorded gestures made by an agent, such as human agent 410; geometries and their motion to provide sign language gestures; and/or other graphical asset and/or instruction for creating processed image from a raw image to comprise a sign language gesture.

In another embodiment, server 404 selects representation 422 of a sign language gesture associated with speech provided by human agent 410. At least one processor, such as associated with server 404 then applies the representation to the live image captured by camera 408 to create a processed image. The processed image is provided, via network 104, to customer communication device 108, such as screen 420 showing the processed image to customer 402.

In another embodiment, camera 424 captures live images of customer 402 to be conveyed to server 404 via network 104. Server 404 then applies a visual recognition image, such as may be known in the art, to generate speech and/or text for presentation to human agent 410 via computer 406 and/or speakers 414.

Figure 5:
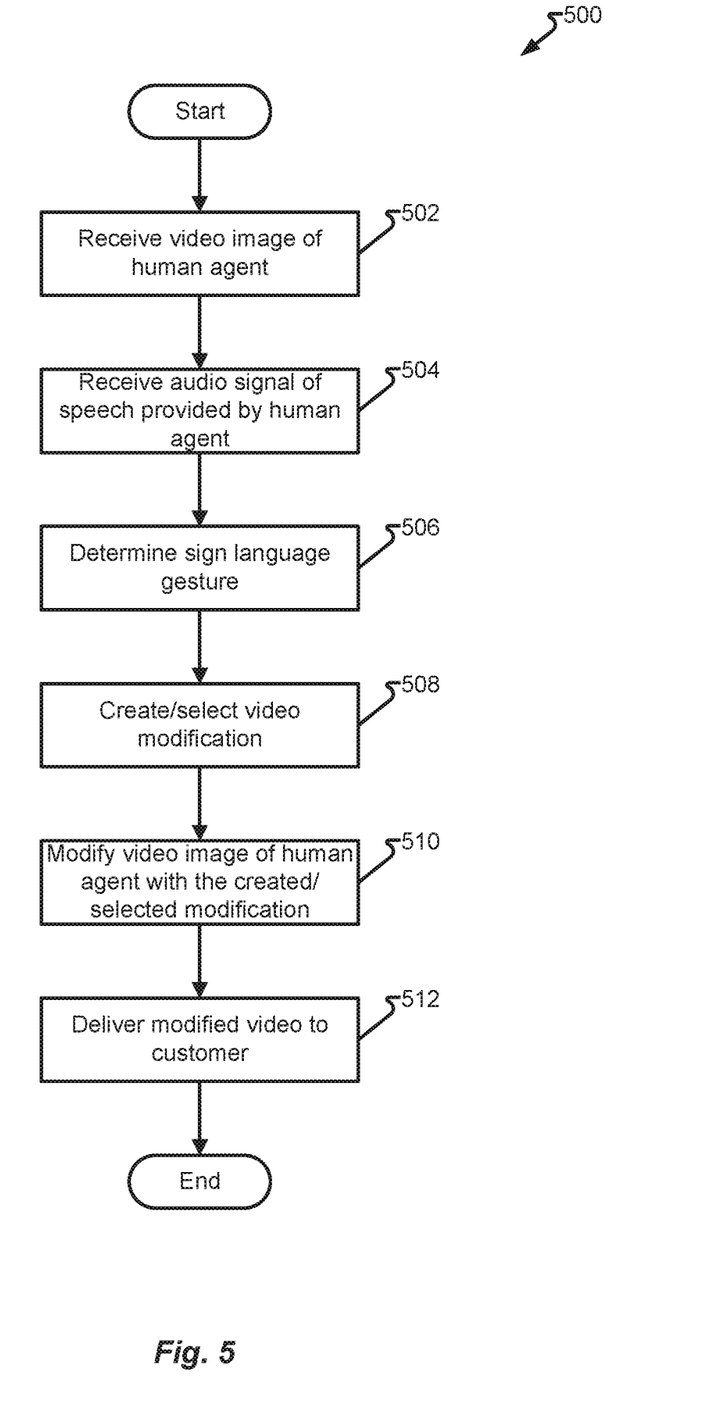
FIG. 5 depicts a process in accordance with embodiments of the present disclosure.

FIG. 5 depicts process 500 in accordance with embodiments of the present disclosure. In one embodiment, process 500 is provided as a set of machine-readable and machine-executable instructions for execution by at least one processor, such as at least one processor of server 404 and/or agent communication device 406 (see, FIG. 4). In one embodiment, step 502 receives a video image of a human agent, such as camera 408 capturing a real-time image of human agent 410 engaged in an interaction with customer 402. Step 504 receives an audio signal of speech provided by a human agent, such as by microphone 412. Step 506 determines a sign language gesture associated with the speech. Step 508 creates and/or generates a video modification, such as via executing instructions or settings describing how at least one processor is to manipulate an image and/or retrieve an associated previously recorded video. Step 510 modifies the image of the human agent with the video modifications and step 512 delivers the modified video to the customer via a customer communication device.

Figure 6:
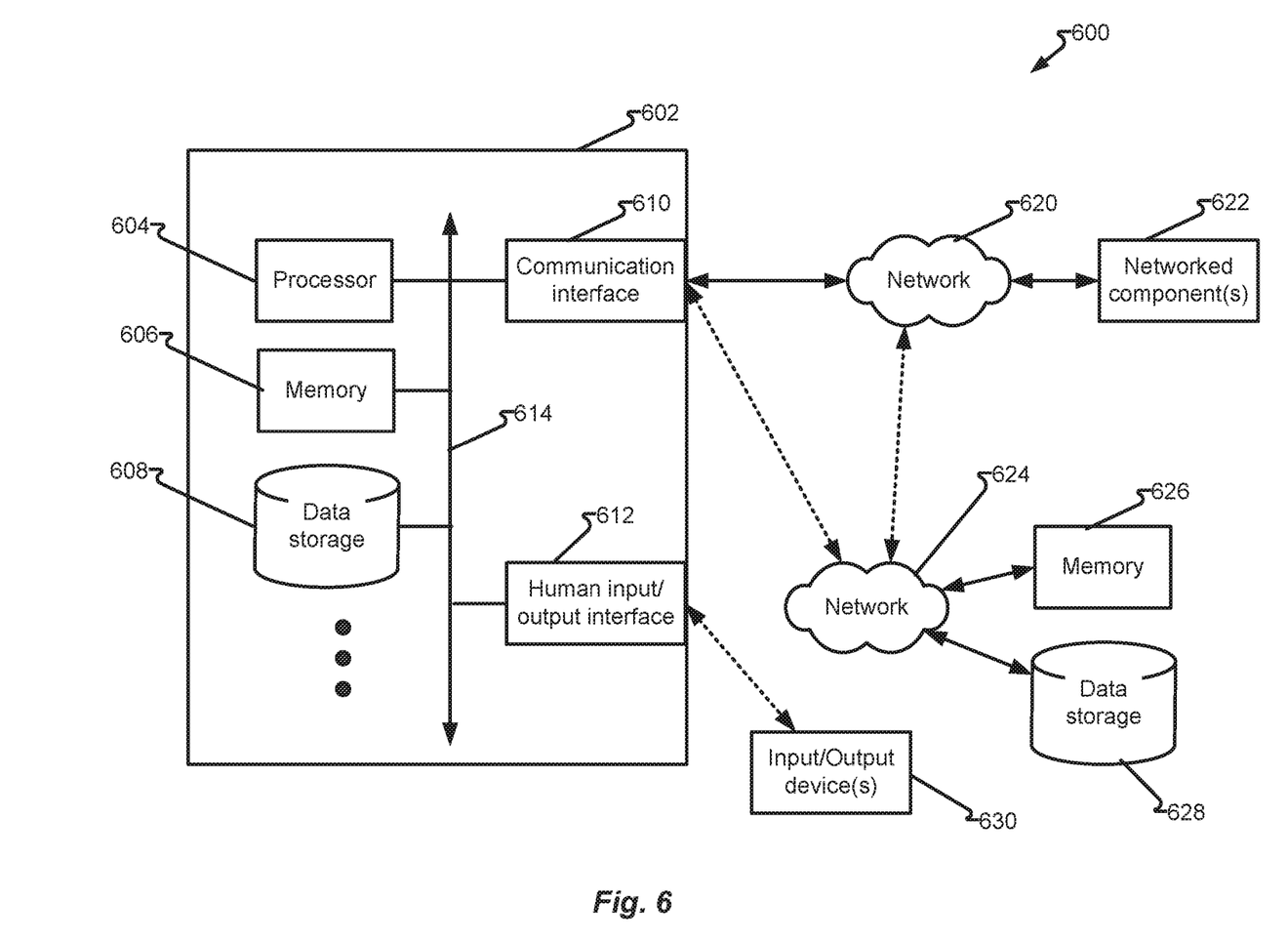
FIG. 6 depicts a third system in accordance with embodiments of the present disclosure.

FIG. 6 depicts device 602 in system 600 in accordance with embodiments of the present disclosure. In one embodiment, agent communication device 406 and/or server 404 may be embodied, in whole or in part, as device 602 comprising various components and connections to other components and/or systems. The components are variously embodied and may comprise processor 604. Processor 604 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 614, executes instructions, and outputs data, again such as via bus 614.

In addition to the components of processor 604, device 602 may utilize memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally or alternatively, input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, etc. In another embodiment, communication interface 610 may comprise, or be comprised by, input/output interface 612. Communication interface 610 may be configured to communicate directly with a networked component or utilize one or more networks, such as network 620 and/or network 624.

Network 104 may be embodied, in whole or in part, as network 620. Network 620 may be a wired network (e.g., Ethernet), wireless (e.g., WiFi, Bluetooth, cellular, etc.) network, or combination thereof and enable device 602 to communicate with network component(s) 622.

Additionally or alternatively, one or more other networks may be utilized. For example, network 624 may represent a second network, which may facilitate communication with components utilized by device 602. For example, network 624 may be an internal network to contact center 102 whereby components are trusted (or at least more so) that networked components 622, which may be connected to network 620 comprising a public network (e.g., Internet) that may not be as trusted. Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. For example, memory 626 and/or data storage 628 may be an external data repository (e.g., server farm, array, "cloud," etc.) and allow device 602, and/or other devices, to access data thereon. Similarly, input/output device(s) 630 may be accessed by processor 604 via input/output interface 612 and/or via communication interface 610 either directly, via network 624, via network 620 alone (not shown), or via networks 624 and 620.

It should be appreciated that computer readable data may be sent, received, stored, processed, and presented by a variety of components. It should also be appreciated that components illustrated may control other components, whether illustrated herein or otherwise. For example, one input/output device 630 may be a router, switch, port, or other communication component such that a particular output of processor 604 enables (or disables) input/output device 630, which may be associated with network 620 and/or network 624, to allow (or disallow) communications between two or more nodes on network 620 and/or network 624. For example, a connection between one particular customer, using a particular customer communication device 108, may be enabled (or disabled) with a particular networked component 622 and/or particular resource 112, such as human agent 410 utilizing agent communication device 406 and various peripheral devices (e.g., camera 408, microphone 412, and/or speaker 414). Similarly, one particular networked component 622 and/or resource 112 may be enabled (or disabled) from communicating with a particular other networked component 622 and/or resource 112, including, in certain embodiments, device 602 or vice versa. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system for real-time sign language translation, comprising:
   a communication interface configured to receive a video image of a human agent engaged in an interaction via a network with a customer utilizing a customer communication device;
   a processor having an accessible memory; and
   the processor configured to:
      receive the video image of the human agent;
      receive an audio input comprising speech of the human agent;
      determine a sign language gesture of the speech;
      modify the video image of the human agent to comprise the sign language gesture; and
   present the customer communication device with the modified video image of the human agent comprising the sign language gesture.

2. The system of claim 1, further comprising:
   a data storage configured to maintain data records accessible to the processor; and
   wherein the processor is further configured to select a record from the data storage comprising a pre-recorded gesture and selected in accordance with the determined sign language gesture of the speech and wherein the processor modifies the video image of the human agent comprising overlaying the pre-recorded gesture on the video image of the human agent.

3. The system of claim 1, wherein the processor is further configured to map portions of the video image comprising associated portions of the human agent's anatomy to the sign language gesture and wherein modifying the video image of the human agent to comprise the sign language gesture, further comprises, placing the mapped portions of the human agent's anatomy to coincide with the sign language gesture.

4. The system of claim 1, wherein the processor is further configured to generate images of portions of the human agent's anatomy to cause the generated images to produce the sign language gesture and wherein the processor modifies the video image of the human agent comprising the generated images overlaying the video image of the human agent.

5. The system of claim 1, wherein the processor modifies the video image of the human agent to comprise the sign language gesture, comprising applying alterations to at least one polygons mapping portions of the video image of the human agent in accordance with alteration data maintained in a data storage.

6. The system of claim 1, wherein the modification of the video image of the human agent to comprise the sign language gesture further comprises modification of a portion of the video image of the human agent chroma key masked and omitting modification of the video image of the human agent that are not chroma key masked.

7. The system of claim 1, wherein the modification of the video image of the human agent to comprise the sign language gesture further comprises modification of a portion of the video image comprising the mouth of the human agent and applying a synchronization modification to cause the speech of the human agent to be synchronized with the sign language gesture.

8. The system of claim 1, wherein the processor is further configured to:
receive a video image of the customer;
determine a sign language gesture from the video image of the customer;
translate the determined sign language gesture into speech; and
present the speech to the human agent.

9. The system of claim 1, wherein the processor is further configured to:
receive a video image of the customer;
determine a sign language gesture from the video image of the customer;
translate the determined sign language gesture into text; and
present the text to the human agent.

10. The system of claim 1, wherein the sign language gesture comprises a plurality of sign language gestures conforming to a previously selected sign language grammar.

11. A method, comprising:
receiving a video image of a human agent engaged in an interaction, via a network, with a customer utilizing a customer communication device;
receiving the video image of the human agent;
receiving an audio input comprising speech of the human agent;
determining a sign language gesture of the speech;
modifying the video image of the human agent to comprise the sign language gesture; and
presenting the customer communication device with the modified video image of the human agent comprising the sign language gesture.

12. The method of claim 11, further comprising:
selecting a record, from a data storage comprising a pre-recorded gesture, the selection being in accordance with the determined sign language gesture of the speech of the human agent; and
wherein modifying the video image of the human agent comprises overlaying the pre-recorded gesture on the video image of the human agent.

13. The method of claim 11, further comprising:
mapping portions of the video image comprising associated portions of the human agent's anatomy to the sign language gesture; and
wherein modifying the video image of the human agent to comprise the sign language gesture, further comprises, placing the mapped portions of the human agent's anatomy to coincide with the sign language gesture.

14. The method of claim 11, further configured:
generating images of portions of the human agent's anatomy to cause the generated images to produce the sign language gesture; and
wherein modifying the video image of the human agent further comprises overlaying the generated images of the portions of the human agent's anatomy onto the video image of the human agent.

15. The method of claim 11, wherein the modifying of the video image of the human agent to comprise the sign language gesture, further comprises applying alterations to at least one polygons mapping portions of the video image of the human agent in accordance with alteration data maintained in a data storage.

16. The method of claim 11, wherein the modifying of the video image of the human agent to comprise the sign language gesture further comprises modifying a portion of the video image of the human agent that is chroma key masked and omitting modification of the video image of the human agent that are not chroma key masked.

17. The method of claim 11, wherein the modifying of the video image of the human agent to comprise the sign language gesture further comprises modifying a portion of the video image comprising the mouth of the human agent and applying a synchronization modification to cause the speech of the human agent to be synchronized with the sign language gesture.

18. The method of claim 11, further comprising:
receiving a video image of the customer;
determining a sign language gesture from the video image of the customer;
translating the determined sign language gesture into speech; and
presenting the speech to the human agent via an agent communication device.

19. The method of claim 11, further comprising:
receiving a video image of the customer;
determining a sign language gesture from the video image of the customer;
translating the determined sign language gesture into text; and
present the text to the human agent via an agent communication device.

20. A system, comprising:
means to receive a video image of a human agent engaged in an interaction, via a network, with a customer utilizing a customer communication device;
means to receive the video image of the human agent;

means to receive an audio input comprising speech of the human agent;
means to determine a sign language gesture of the speech;
means to modify the video image of the human agent to comprise the sign language gesture; and
means to present the customer communication device with the modified video image of the human agent comprising the sign language gesture.

\* \* \* \* \*